United States Patent
Zachary et al.

(10) Patent No.: US 10,335,957 B2
(45) Date of Patent: Jul. 2, 2019

(54) MAGNETICALLY ACTIVATED TOOL CHANGER

(71) Applicant: ATI Industrial Automation, Inc., Apex, NC (US)

(72) Inventors: Kyle Russell Zachary, Fuquay Varina, NC (US); Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 15/496,062

(22) Filed: Apr. 25, 2017

(65) Prior Publication Data

US 2018/0304475 A1 Oct. 25, 2018

(51) Int. Cl.
B25J 15/04 (2006.01)

(52) U.S. Cl.
CPC ............ *B25J 15/0416* (2013.01); *B25J 15/04* (2013.01); *B25J 15/0441* (2013.01)

(58) Field of Classification Search
CPC .............. B25J 15/0608; B25J 15/0416; B25J 15/0458; B25J 15/04; B25D 15/0441
See application file for complete search history.

(56) References Cited

U.S. PATENT DOCUMENTS

| | | | | |
|---|---|---|---|---|
| 2,470,720 A | * | 5/1949 | Proctor | B23B 31/162 279/119 |
| 3,185,494 A | * | 5/1965 | Dziedzic | B23Q 3/15526 279/89 |
| 3,752,019 A | * | 8/1973 | Kaneko | B23B 31/205 279/4.09 |
| 4,635,328 A | * | 1/1987 | Palmer | B23Q 1/0009 29/26 A |
| 5,954,446 A | * | 9/1999 | Ireland | B23K 9/32 403/11 |
| 2007/0235949 A1 | * | 10/2007 | Gloden | B23B 31/1071 279/2.12 |
| 2010/0062919 A1 | * | 3/2010 | Norton | B23B 31/103 483/55 |
| 2017/0120454 A1 | * | 5/2017 | Ferguson | B25J 19/0045 |
| 2017/0225339 A1 | * | 8/2017 | Kerestes | B25J 15/0441 |

* cited by examiner

*Primary Examiner* — Daniel W Howell
*Assistant Examiner* — Paul M Janeski
(74) *Attorney, Agent, or Firm* — Coats & Bennett, PLLC

(57) ABSTRACT

A robotic tool changer in which the coupling mechanism is actuated using magnetic force is provided. In one exemplary embodiment, a robotic tool changer may include a tool unit operatively connected to a robotic tool and a master unit operative to connect to a robotic arm. The master unit may include a housing and a piston. The piston may be disposed at least partially within the housing and configured to place the master unit in one of a coupled state and a decoupled state. Further, the master unit may be operative to assume the coupled state or the decoupled state in response to altering an orientation of magnetic fields to provide a first magnetic force that moves the piston to the coupled state or provide a second magnetic force that moves the piston to the decoupled state.

20 Claims, 11 Drawing Sheets

MAGNETICALLY ACTIVATED TOOL CHANGER

FIELD OF INVENTION

The present invention relates generally to robotics, and in particular to a robotic tool changer in which the coupling mechanism is actuated using magnetic force.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, it is cost-effective to utilize a relatively generic robot arm to accomplish a variety of tasks. For example, in an automotive manufacturing application, a robot arm may be utilized to cut, grind, or otherwise shape metal parts during one phase of production, and perform a variety of welding tasks in another. Different welding tool geometries may be advantageously mated to a particular robot arm to perform welding tasks at different locations or in different orientations.

In these applications, a tool changer is used to mate different robotic tools to the robot. One half of the tool changer, called the master unit, is permanently affixed to a robot arm. The other half, called the tool unit, is affixed to each robotic tool that the robot may utilize. The various robotic tools a robot may utilize are typically stored, within the range of motion of the robot arm, in tool stands which are sized and shaped to hold each tool securely when not in use. When the robot arm positions the master unit, on the end of the robot arm, adjacent to a tool unit connected to a desired robotic tool sitting in a tool stand, a coupling mechanism is actuated that mechanically locks the master and tool units together, thus affixing the robotic tool to the end of the robot arm. The tool changer thus provides a consistent mechanical interface between a robot arm and a variety of robotic tools. A tool changer may also pass utilities, such as electrical current, air pressure, hydraulic fluid, cooling water, electronic or optical data signals, and the like, to a robotic tool.

A variety of coupling mechanisms are known in the art of robotic tool changers. One simple, reliable, scalable mechanism comprises a piston moveable along a longitudinal axis, with a plurality of rolling members, such as balls or cylinders, disposed radially around the piston—either interior or exterior to the piston. As the piston advances from a retracted to an extended position, an angled surface of the piston contacts the rolling members, urging them either inwardly or outwardly as the piston advances. The piston and rolling members may be disposed on one unit of the tool changer, such as the master unit. As the rolling members are displaced by the piston, they contact an angled surface in the other unit, such as the tool unit. Pressure on the angled surface locks the tool unit to the master unit, until the piston is retracted and pressure on the rolling members is relieved.

In this type of coupling mechanism, continuous motive force must be provided, driving the piston toward the extended position, to keep the tool unit locked to the master unit. This force may, for example, be provided by mechanical springs, pneumatic pressure, or the like. When springs are used, a large force must be applied to retract the piston, against the force of the springs, when decoupling the tool unit from the master unit. Such decoupling force may be excessive for hand-actuated tool changers. In tool changers that use pneumatic fluid to drive the piston, a constant source of pneumatic fluid must be provided. Any failure of the pneumatic source, supply lines, O-rings, or the like may result in loss of pressure, presenting a safety hazard as the tool unit (and attached tool) may become decoupled from the master unit (and hence from the robot).

A need exists in the art for a coupling mechanism for a robotic tool changer, which applies a strong, continuous, failure-proof motive force to a piston while coupled, but which may be decoupled without requiring the application of a large force. For safety, as well as reduced cost, complexity, weight, and the like, the motive force should not require an external source of power, or coupling between an external power source and tool changer coupling mechanism.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, the piston of a tool changer coupling mechanism is driven by magnetic force. A first polymagnetic member, at least partially rotatable about the axis of the piston, includes a plurality of magnets, with at least two projecting magnetic fields in opposite orientation. A second polymagnetic member, which includes a plurality of magnets, with at least two projecting magnetic fields in opposite orientation, is stationary, and mechanically coupled to the piston. As the first polymagnetic member is rotated, the oppositely-oriented magnetic fields projecting therefrom align with corresponding oppositely-oriented magnetic fields projecting from the second polymagnetic member. The interaction of the magnetic fields provides motive force to drive the piston from the retracted position to the extended position. In one embodiment, the aligned magnetic fields are oppositely oriented, and a magnetic attractive force drives the piston. In another embodiment, the aligned magnetic fields have the same orientation, and a magnetic repulsive force drives the piston.

According to one aspect, a robotic tool changer may include a tool unit operatively connected to a robotic tool and a master unit operative to connect to a robotic arm. The master unit may include a housing and a piston. The piston may be disposed at least partially within the housing and configured to place the master unit in one of a coupled state and a decoupled state. Further, the master unit may be operative to assume the coupled state or the decoupled state in response to altering an orientation of magnetic fields to provide a first magnetic force that moves the piston to the coupled state or provide a second magnetic force that moves the piston to the decoupled state.

According to another aspect, the piston may be actuated along a piston axis between a retracted position and an extended position. Further, the retracted position may correspond to the decoupled state of the master unit and the extended position may correspond to the coupled state of the master unit.

According to another aspect, the tool unit may further include a bearing race disposed radially around the piston axis and one or more rolling members disposed radially around the piston axis in the bearing race. Further, the piston may include at least one angled surface operative to engage and radially move the one or more rolling members to engage the bearing race as the piston axially moves from the retracted position to the extended position.

According to another aspect, the at least one angled surface may include an initial contact surface including a conical surface operative to contact the one or more rolling members and urge them radially with respect to the piston axis, towards the bearing race, as the piston moves from the retracted position toward the extended position.

According to another aspect, the at least one angled surface may include a locking surface including a conical surface inclined in the same direction as the initial contact surface, and operative to press the one or more rolling members against the bearing race when the piston is in the extended position; and According to another aspect, the at least one angled surface may include a failsafe surface interposed between the initial contact surface and the locking surface, and operative to resist movement of the piston, due to force applied to the piston by the one or more rolling members, from the extended position toward the retracted position.

According to another aspect, the failsafe surface may include a cylindrical surface centered on the piston axis, wherein a force applied to the failsafe surface from the one or more rolling members is normal to the piston axis.

According to another aspect, the failsafe surface may include a conical or arcuate surface having an opposite inclination with respect to the piston axis from the initial contact and locking surfaces. Further, the one or more rolling members may be further moved at least slightly towards the bearing race to move the piston from the extended position towards the retracted position.

According to another aspect, the master unit may further include a first magnetic member projecting a plurality of magnetic fields over different surface areas of the first magnetic member. Further, at least two of the magnetic fields may have opposite orientation with the first magnetic member operative to circumferentially move at least partially about the piston axis between a first radial position and a second radial position.

According to another aspect, the first magnetic member may include a plurality of magnets affixed to a disc. Further, the magnets may be oriented to project the at least two magnetic fields having opposite orientation.

According to another aspect, the first magnetic member may include a disc. Further, different surface areas of the disk may be magnetized so as to project the at least two magnetic fields having opposite orientation.

According to another aspect, one of the master unit and the tool unit may be further configured to project a plurality of magnetic fields over different surface areas of the first magnetic member.

According to another aspect, the first magnetic member may be moveable within the housing along the piston axis so that the first magnetic member is magnetically coupled to or decoupled from the corresponding master unit or tool unit.

According to another aspect, when the first magnetic member is in the first radial position, a net attractive magnetic force between the first magnetic member and the master unit may move the piston to the retracted position. Further, when the first magnetic member is in the second radial position, a net repulsive magnetic force between the first magnetic member and the master unit may move the piston to the extended position.

According to another aspect, when the first magnetic member is in the first radial position, a net repulsive magnetic force between the first magnetic member and the tool unit may move the piston to the retracted position. Further, when the first magnetic member is in the second radial position, a net attractive magnetic force between the first magnetic member and the tool unit may move the piston to the extended position.

According to another aspect, the first magnetic member may be manually moved between the first and second radial positions.

According to another aspect, the first magnetic member may include a handle extending outwardly of the housing. Further, the handle may be operative to circumferentially move the first magnetic member at least partially about the piston axis between the first radial position and the second radial position.

According to another aspect, the handle may include a spring-biased locking tab operative to lock the handle against the housing when the first magnetic member is in the second radial position.

According to another aspect, the tool unit may further include a coupling receptacle configured to mechanically couple to the piston.

According to one aspect, a method of operating a robotic tool changer having a master unit and a tool unit, with the master unit having a piston configured to place the master unit in a coupled state or a decoupled state, may include aligning and abutting the master unit to the tool unit using the piston. The coupled state associated with the master unit may be securely coupled to the tool unit and the decoupled state associated with the master unit may be decoupled from the tool unit. Further, the method may include placing the master unit in the coupled state by altering an orientation of magnetic fields to provide a first magnetic force that moves the piston to the coupled state. Also, the method may include placing the master unit in the decoupled state by altering an orientation of the magnetic fields to provide a second magnetic force that moves the piston to the decoupled state.

According to another aspect, the master unit may further include a first magnetic member projecting a plurality of magnetic fields over different surface areas of the first magnetic member. At least two of the magnetic fields may have opposite orientation. Further, the first magnetic member may be operative to circumferentially move at least partially about the piston axis between a first radial position and a second radial position. The step of placing the master unit in the decoupled state may include circumferentially moving the first magnetic member at least partially about the piston axis to the first radial position. Also, the step of placing the master unit in the coupled state may include circumferentially moving the first magnetic member at least partially about the piston axis to the second radial position.

According to another aspect, one of the master unit and the tool unit may further include projecting a plurality of magnetic fields over different surface areas of the first magnetic member. The step of placing the master unit in the decoupled state may include circumferentially moving the first magnetic member at least partially about the piston axis to a first radial position so that a net repulsive magnetic force between the first magnetic member and the corresponding master unit or tool unit moves the piston to the retracted position. Further, the step of placing the master unit in the coupled state may include circumferentially moving the first magnetic member at least partially about the piston axis to a second radial position so that a net attractive magnetic force between the first magnetic member and the corresponding master unit or tool unit moves the piston to the extended position.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
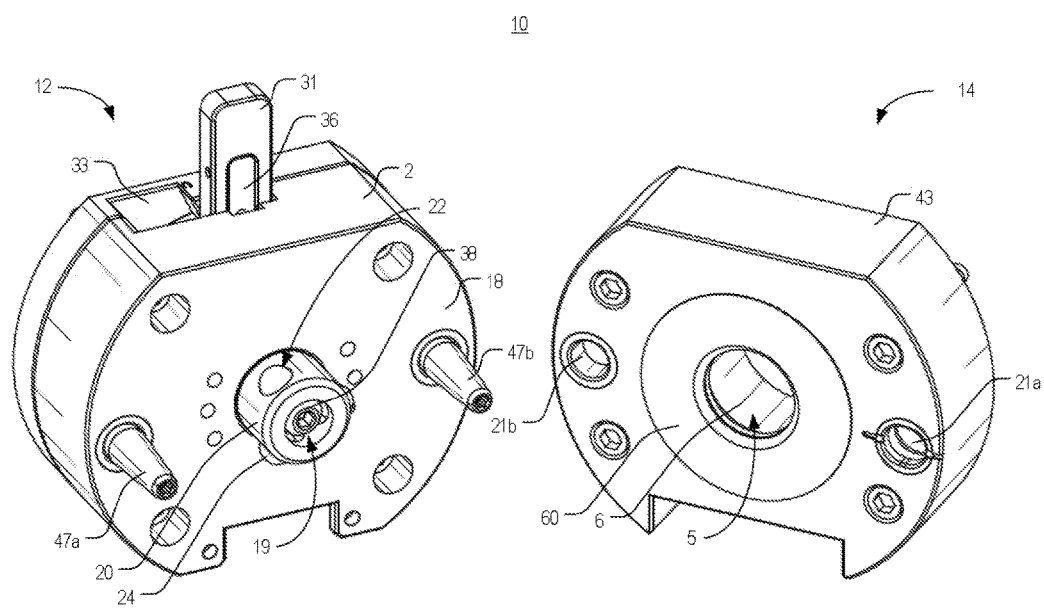
FIG. 1 provides a perspective view of one embodiment of a master unit and a tool unit of a robotic tool changer in accordance with various aspects as described herein.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a robotic tool changer. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "couple" and "decouple," used as verbs, mean to directly or indirectly join one unit, function, feature, structure, or characteristic to or in communication with another unit function, feature, structure, or characteristic. The terms "coupled state" and "decoupled state" refer to different states, modes, or conditions of a master unit and/or a coupling mechanism in the master unit. The terms "locked position" and "unlocked position" are terms of reference, referring to different terminal positions of moveable pistons. Relational terms such as "first" and "second," and the like may be used solely to distinguish one entity or action from another entity or action without necessarily requiring or implying any numerical relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

With further reference to the drawings, the robotic tool changer of the present disclosure is shown therein and indicated generally by the numeral 10. The robotic tool changer 10 may be configured to include a master unit 12 and a tool unit 14 that are adapted to be coupled together. In use, the master unit 12 may be coupled to a robotic arm (not shown) while the tool unit 14 may be coupled to a particular tool (not shown). Furthermore, during use, there may be provided a series of tool units 14 with each tool unit 14 carrying or supporting a particular tool. Hence, during use, the respective tool units 14 may be coupled and decoupled to the master unit 12. The robotic tool changer 10 disclosed herein is similar in many respects to that disclosed in U.S. Pat. No. 8,005,570, which is expressly incorporated herein by reference.

Since most robotic systems typically include a robotic arm, a master unit 12 and a plurality of tool units 14, each coupled to a different tool, it is common to locate active components of the tool changer 10 within the master unit 12. However, it is appreciated that the distribution of active and passive components within the master unit 12 and the tool unit 14 may be reversed. Although the master unit 12 may be connected to a robotic arm and the tool unit 14 may be connected to a robotic tool, this particular orientation may be reversed in any given application.

As discussed below, one of the principal functions of the robotic tool changer 10 is to provide a system for quickly and efficiently coupling and decoupling tool units 14 to the master unit 12. However, the robotic tool changer 10 includes additional facilities for the provision of various services and utilities to the attached tool. For example, it is common to provide a master electrical contact with the master unit 12. This permits electrical service to be channeled through the master unit 12, through the tool unit 14 and ultimately to the tool. For example, relatively large electrical currents such as those utilized by a welding tool can be passed from an electrical source through the robotic system to the tool unit 14. In like fashion, fluids such as pneumatics can be transferred through the master unit 12 to the tool unit 14 for use by a particular tool connected thereto. Other such services and utilities, which are typically provided by robotic tool changers include hydraulic fluid, cooling fluid, oil, and data transfer. Details of these services and utilities are not dealt with here in detail because such is not per se material to the present disclosure and because robotic tool changers of the general type shown herein are commercially known and available.

Turning now to a discussion of the master unit 12 and the tool unit 14, FIGS. 1-7 provide various views of one embodiment of the master unit 12 and the tool unit 14 in accordance with various aspects as described herein. In FIG. 1, the master unit 12 is shown in a decoupled state and is not coupled to the tool unit 14. The master unit may include a housing 2, a chamber 15, a piston 30, alignment posts 47a-b, a handle 31, a spring-biased locking tab 36, a handle aperture 33, and first and second magnetic members 71 and 73. In this embodiment, the second magnetic member 73 is shown in the master unit 12; however, in other embodiments, the second magnetic member 73 may be in the tool unit 14. The chamber 15 may be cylindrical with a cylindrical wall 16. The housing 2 may include a horizontal member 18. The horizontal member 18 may be configured to include an annular ring 20 projecting therefrom. The annular ring 20 may include a central opening 19. Further, the annular ring 20 may include one or more apertures 22 formed in the annular ring 20. The annular ring 20 may also include one or more rolling members 24 held or disposed in each of the one or more apertures 22. The area in and around the apertures 22 may also be referred to as a retention area as this area tends to at least partially retain the rolling members 24.

As will be discussed subsequently herein, the rolling members 24 may be utilized to lock the master unit 12 with the tool unit 14. The horizontal member 18 may also include the second magnetic member 73. The second magnetic member 73 may be centered with respect to the horizontal member 18 and the central opening 19. Further, the second magnetic member 73 may be fixed to the housing 2 such as to the horizontal member 18. The second magnetic member 73 may project a plurality of magnetic fields over different surface areas of the second magnetic member 73 with the magnetic fields having the same orientation or at least two of the magnetic fields having opposite orientation. In one example, the second magnetic member 73 may include a plurality of magnets affixed to a disc with the magnets oriented to project the magnetic fields in the same orientation or at least two of the magnetic fields having opposite orientation. In another example, the second magnetic member 73 may be a polymagnetic member. A polymagnetic member may include one or more precision-tailored POLYMAGNETS® available from Correlated Magnetics Research and described at www.polymagnet.com. POLYMAGNETS® contain patterns of north and south poles on a single piece of magnetic material. Further, POLYMAGNETS® can be made into any shape or size. A skilled artisan will recognize various techniques for configuring POLYMAGNETS® on the first magnetic member 71 or the second magnetic member 73 to provide sufficient attractive or repulsive magnetic forces to place the piston 30 in a respective retracted or extended position.

Figure 2:
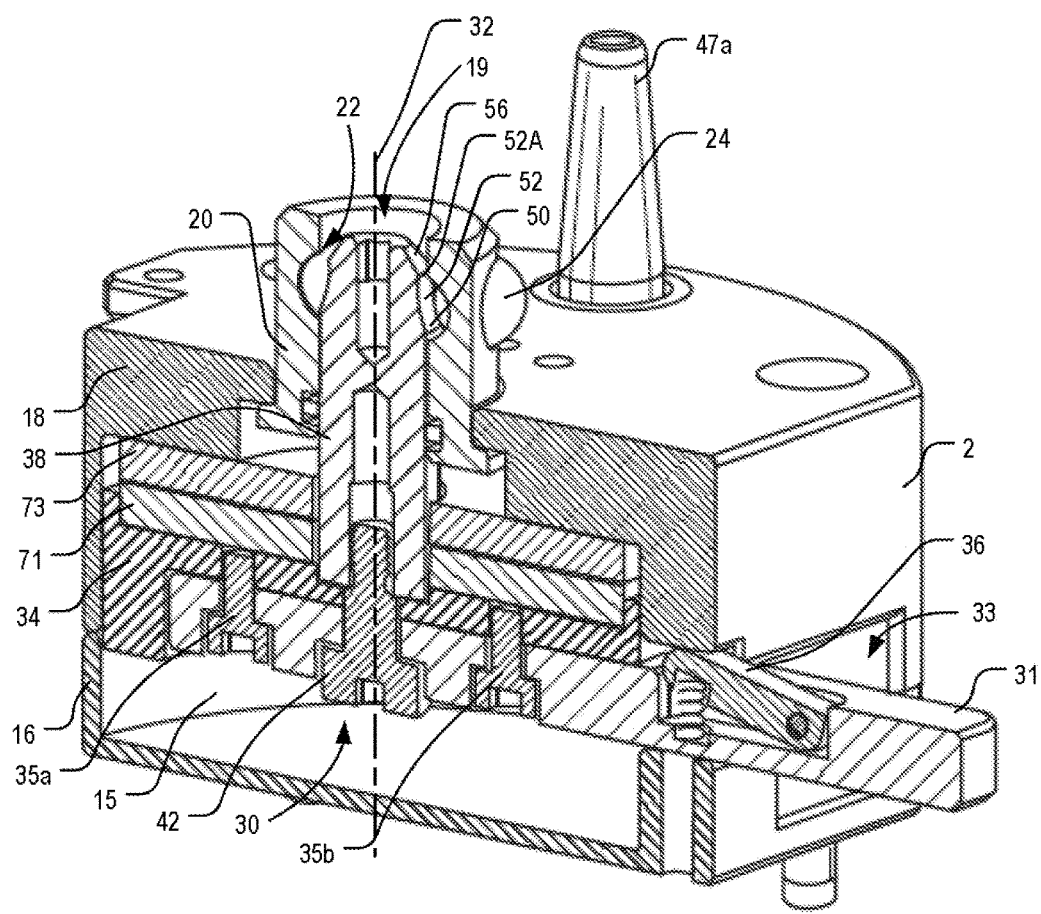
FIG. 2 is a cross-sectional view of the master unit of FIG. 1 in a locked position in accordance with various aspects as described herein.
Figure 3:
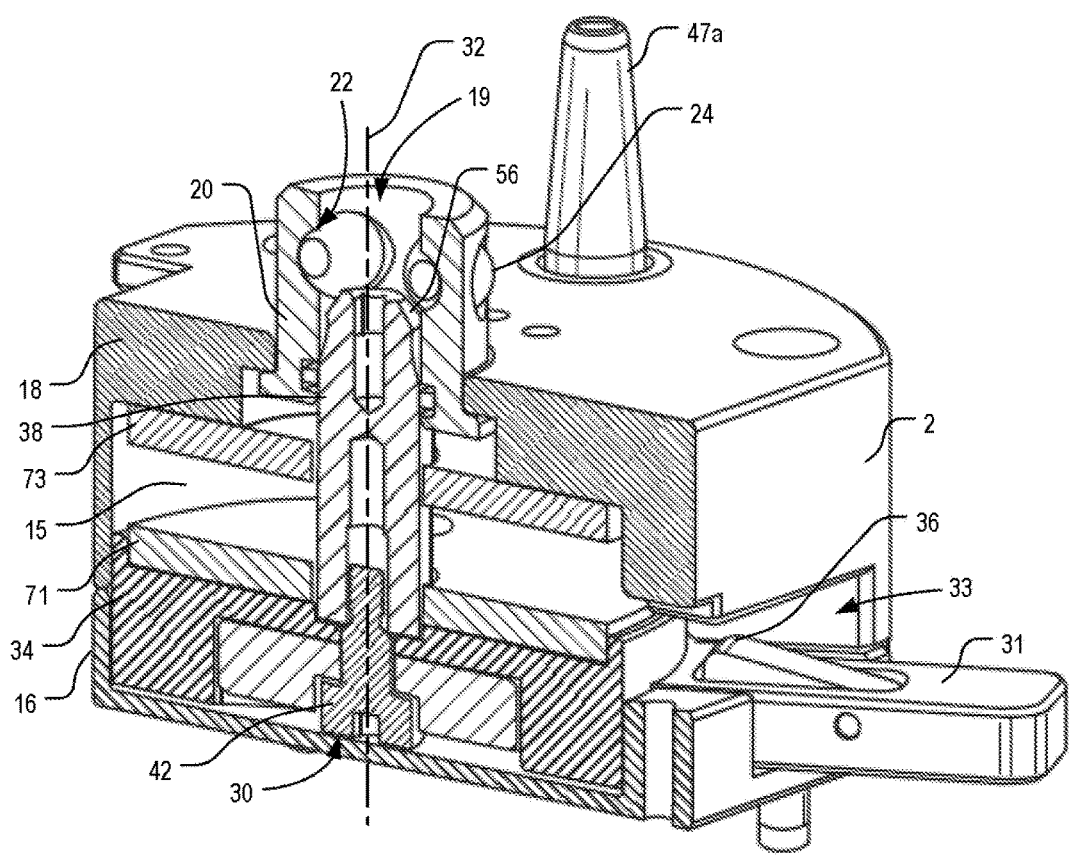
FIG. 3 is a cross-sectional view of the master unit of FIG. 1 in an unlocked position in accordance with various aspects as described herein.

In one embodiment, disposed within the chamber 15 may be a double acting piston indicated generally by the reference 30. The piston 30 may be actuated back and forth in the chamber 15 by a magnetic force. The piston 30 may move about a longitudinal axis indicated by the reference 32. Further, the piston 30 may include a base 34 that is slidably contained within the chamber 15. The piston 30 may also include a stem 38 that may be centered with respect to the base 34, the horizontal member 18 and the central opening 19. In one example, the longitudinal axis 32 may extend centrally through the stem 38 and the central opening 19. As shown in FIGS. 2-3, the stem 38 may extend through the opening 19 formed in the horizontal member 18. A screw 42 extends through a portion of the base 34, a portion of the first magnetic member 71 (which may include the handle 31), and into a threaded cavity formed in the stem 38. By tightening the screw 42, the base 34, the handle 31, and the first magnetic member 71 may be coupled or connected to the stem 38 to form the piston 30.

In this embodiment, the piston 30 may include the first magnetic member 71. The first magnetic member 71 may be centered with respect to the base 34 and the stem 38. Further, the first magnetic member 71 may be fixed to the base 34, the stem 38, or both. The first magnetic member 71 may be planar to and opposite from the second magnetic member 73. The first magnetic member 71 may project a plurality of magnetic fields over different surface areas of the first magnetic member 71 with the magnetic fields having the same orientation or at least two of the magnetic fields having opposite orientation. In one example, the first magnetic member 71 may include a plurality of magnets affixed to a disc with the magnets oriented to project the magnetic fields having the same orientation or at least two of the magnetic fields in an opposite orientation. In another example, the first magnetic member 71 may be a polymagnetic member.

Furthermore, the first magnetic member 71 may be operative to circumferentially move at least partially about the piston axis 32 between a first radial position and a second radial position. The first magnetic member 71 may include the handle 31 extending outwardly from the handle aperture 33 in the housing 2. The handle 31 may be fixed to the first magnetic member via screws 35a-b. The handle 31 may operate to circumferentially move the first magnetic member 71 at least partially about the piston axis 32 between the first radial position and the second radial position within the opening 33. The handle 31 may include a locking tab 36

(e.g., a spring-biased locking tab) operative to lock the handle 31 against the housing 2 when the first magnetic member 71 is in the second radial position, as shown in FIG. 2. Otherwise, the locking tab 36 may be operative to unlock the handle 31 to allow the first magnetic member 71 to be circumferentially moved via the handle 31 to the first radial position, as shown in FIG. 3.

An outer perimeter of the stem 38 may be configured to engage the rolling members 24 to effectuate locking the master unit 12 to the tool unit 14. The outer perimeter of the stem 38 may be configured to cooperate with the locking members 24 to achieve both a locking and an unlocking function. Accordingly, the outer perimeter or outer area of the stem 38 may include a contact area for contacting the one or more rolling members 24 and for urging the rolling members 24 into a locked relationship with a portion of the tool unit 14 to be described subsequently herein.

Figure 4:
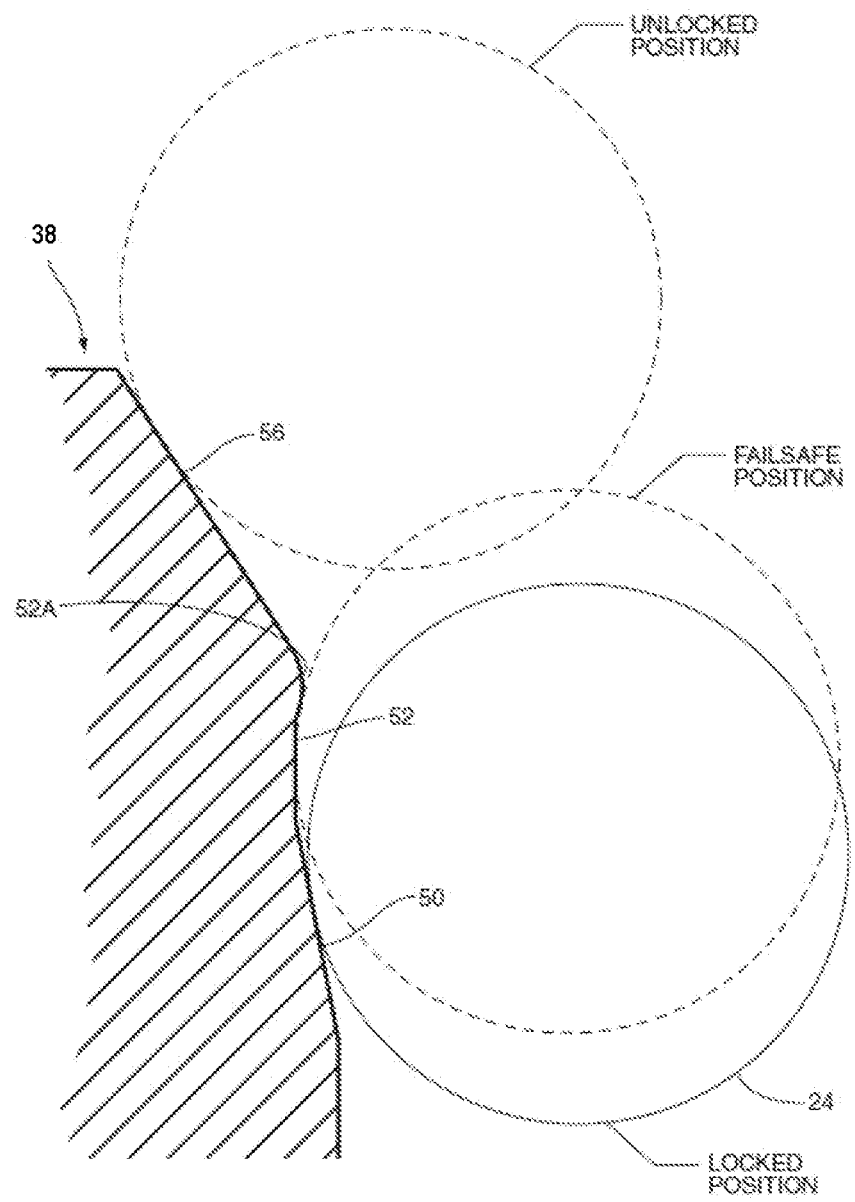
FIG. 4 is a schematic illustration showing the relationship between a portion of the stem of the piston and the rolling member of FIG. 1 as the piston moves between locked, failsafe, and unlocked positions in accordance with various aspects as described herein.
Figure 5:
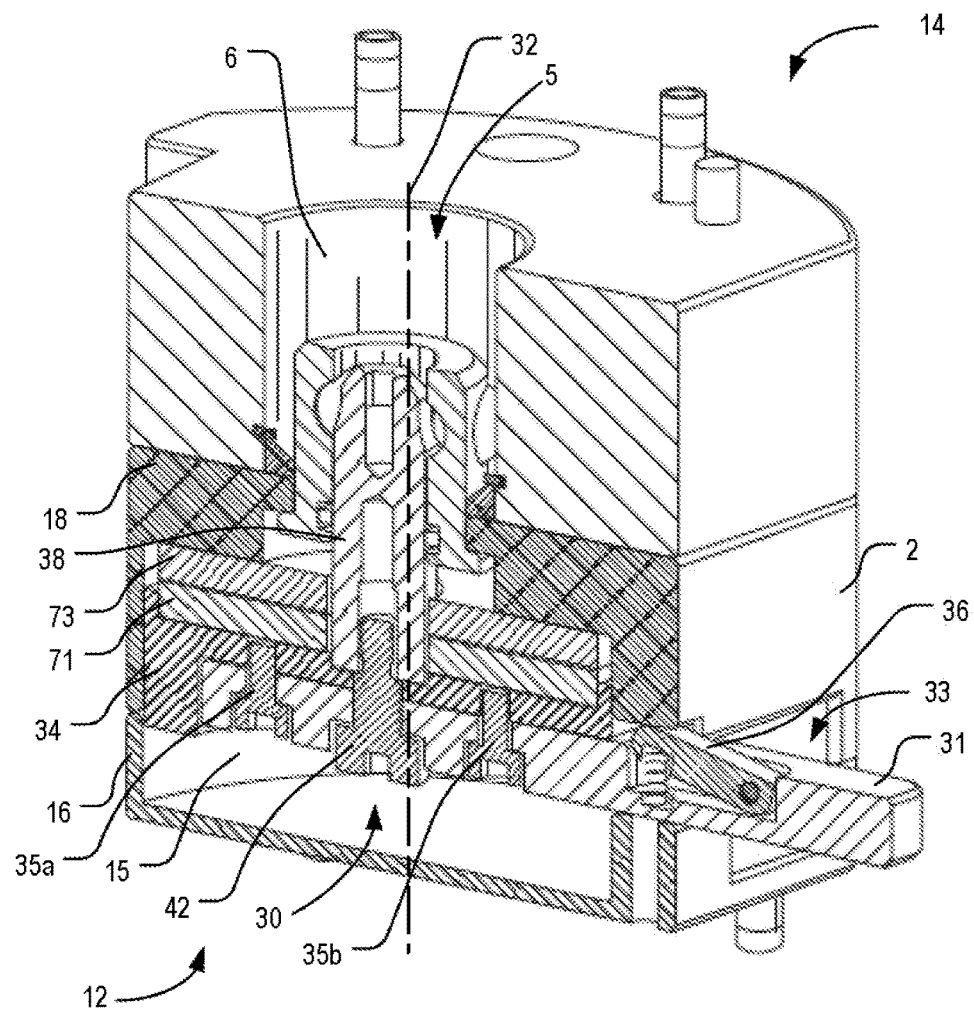
FIG. 5 is a cross-sectional view of the robotic tool changer of FIG. 1 showing the piston of the master unit in a locked position in accordance with various aspects as described herein.

Viewing the contact area of the stem 38, the stem 38 may include a locking surface 50, as shown in FIG. 4. The locking surface 50 may be disposed at a taper or an angle of the outer perimeter of the stem 38 with respect to the longitudinal axis 32. In one example, the locking surface 50 of the outer perimeter of the stem 38 may taper generally upwardly and inwardly with respect to the longitudinal axis 32. As will be discussed subsequently herein, when the piston 30 assumes the locked position, the locking surface 50 may engage the rolling members 24 and may cause the rolling members 24 to engage a portion of the tool unit 14 and lock the master unit 12 and the tool unit 14 together.

Also formed on the contact area of the stem 38 may be a contact surface 56 that is sometimes referred to as an unlocking surface, as shown in FIG. 4. The contact surface 56 may be tapered upwardly and inwardly towards the longitudinal axis 32. The contact surface 56 may provide two functions. As the piston 30 moves from the unlocked position to the locked position, the contact surface 56 surrounding the stem 38 of the piston may contact the rolling members 24 and may urge the same outwardly through the openings or apertures 22 formed in the annular ring 20. In addition, when the piston 30 assumes the unlocked position, the contact surface 56 may lie adjacent or below the rolling members 24, as shown in FIG. 3. Because of the shape of the apertures 22 and the position and shape of the contact surface 56, the rolling members 24 may be permitted to move to one side of the apertures 22, as shown in FIG. 3. The contact surface 56 of the stem 38 may prevent the rolling members 24 from falling from the apertures 22. At the same time, the position of the rolling members 24 may permit the tool unit 14 to be decoupled from the master unit 12 without interference from the rolling members 24.

Disposed adjacent the locking surface 50 may be a failsafe surface 52, as shown in FIG. 4. In this embodiment, a portion of the failsafe surface 52 may include a generally cylindrical surface that extends generally parallel to the longitudinal axis 32 of the piston 30. The failsafe surface 52 may also include another portion which is referred to as a retarding surface 52A. As shown in FIG. 4, the failsafe surface 52 may extend generally between the locking surface 50 and the unlocking surface 56. The cylindrical portion of the failsafe surface 52 may be disposed adjacent the locking surface 50. The retarding portion 52A of the locking surface 50 may be disposed adjacent the unlocking surface 56. A purpose of the failsafe surface 52 may be to prevent the piston 30 from inadvertently or accidentally moving from the locked position to the unlocked position. For example, in the locked position shown in FIG. 2, the one or more rolling members 24 may cause a force to be directed against the stem 38 that will tend to drive the piston to the unlocked position in the event of an interruption in the actuating force that urges the piston 30 to the locked position. If there is an inadvertent interruption in the actuating force acting on the piston 30, then the piston 30 may tend to move from the locked position to the failsafe position. The cylindrical portion of the failsafe surface 52 may aid in maintaining a coupled relationship between the master unit 12 and the tool unit 14. In particular, the normal force directed against the rolling members 24 by the cylindrical portion of the failsafe surface 52 may produce no significant force component in the axial direction. The retarding surface 52A that forms a part of the failsafe surface 52 may project at least slightly outwardly from the cylindrical portion of the failsafe surface 52. The engagement of the retarding surface 52A with the one or more rolling members 24 may give rise to at least a slight resistance to further movement of the piston 30 towards the unlocked position.

Turning to the tool unit 14, as discussed above and depicted in FIG. 1, the master unit 12 may be adapted to be coupled to the tool unit 14. As a robot arm approaches the tool unit 14, the master unit 12 may be brought into contact with the tool unit 14. Initially, the alignment posts 47a-b may mate in the corresponding alignment receptacles 21a-b, aiding in alignment of the master unit 12 and the tool unit 14. Additionally, the stem 38 of the piston 30 of the master unit 12 may mate with a coupling receptacle 5 of the tool unit 14. The coupling receptacle 5 may be cylindrical with a cylindrical wall 6. Further, the coupling receptacle may include a locking race 60. The locking race 60 may be designed to be disposed at the surface of the master unit 12 and may assume a position outwardly of and adjacent the rolling members 24. Further, the race 60 may substantially conform to a shape of the rolling members 24, allowing the tool unit 14 to be securely coupled to the master unit 12. To lock the tool unit 14 with the master unit 12, the piston 30 may be actuated and driven upwardly, as viewed in FIG. 5. Eventually, the contact surface 56 of the piston 30 may engage the rolling members 24 urging them outwardly through the apertures 22 of the annular ring 20 and adjacent the failsafe surface 52—as viewed in FIG. 5 into the locked position shown therein.

In the failsafe position, the failsafe surface 52 may still engage the rolling members 24, as shown in FIG. 4. When the cylindrical portion of the failsafe surface 52 engages the rolling members 24, the failsafe surface may aid in maintaining the coupled relationship between the master unit 12 and the tool unit 14 even though there may be no significant opposing axial force created. However, when the piston 30 attempts to move past the ridge or retarding surface 52A, there will be an opposing axial force created by the engagement of the ridge 52A with the rolling members 24. This will provide at least a slight and positive resistance that must be overcome in order for the piston 30 to move to the unlocked position. That is, as the rolling members attempt to clear the ridge 52A, there will be at least a slight opposing axial force created.

When the piston 30 assumes the unlocked position, the locking race 60 may be free to move from the coupled position. More particularly, the unlocking surface 56 permits the rolling members 24 to assume the unlocked position shown in FIG. 4, which in turn frees the locking race 60, allowing the tool unit 14 to be decoupled from the master unit 12.

Figure 6:
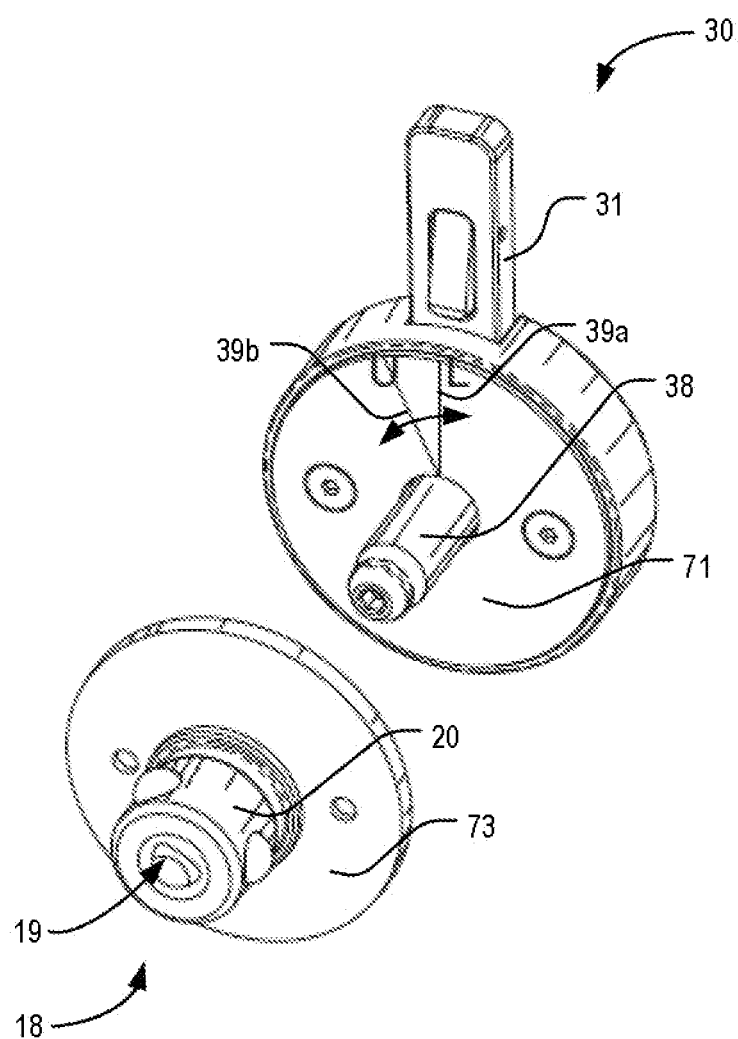
FIG. 6 provides a perspective view of one embodiment of a portion of the horizontal member and the piston of the master unit of FIG. 1 in accordance with various aspects as described herein.

In one embodiment, as previously mentioned, the master unit 12 may include the first magnetic member 71 that projects a plurality of magnetic fields over different surface areas of the first magnetic member 71. The magnetic fields may have the same orientation or at least two of the magnetic fields may have opposite orientation. Further, the first magnetic member 71 may be operative to circumferentially move at least partially about the piston axis 32 between the first radial position 39a corresponding to the unlocked position (U) and the second radial position 39b corresponding to the locked position (L), as shown in FIG. 6. To lock the tool unit 14 with the master unit 12, the first magnetic member 71 may be circumferentially moved to the second radial position 39b. By doing so, the first and second magnetic members 71 and 73 are radially aligned so that a net attractive magnetic force between the first and second magnetic members 71 and 73 actuates the piston 30 into the extended position. To unlock the tool unit 14 from the master unit 12, the first magnetic member 71 may be circumferentially moved to the first radial position 39a. By doing so, the first and second magnetic members 71 and 73 are radially aligned so that a net repulsive magnetic force between the first and second magnetic members 71 and 73 actuates the piston 30 into the retracted position.

Figure 7:
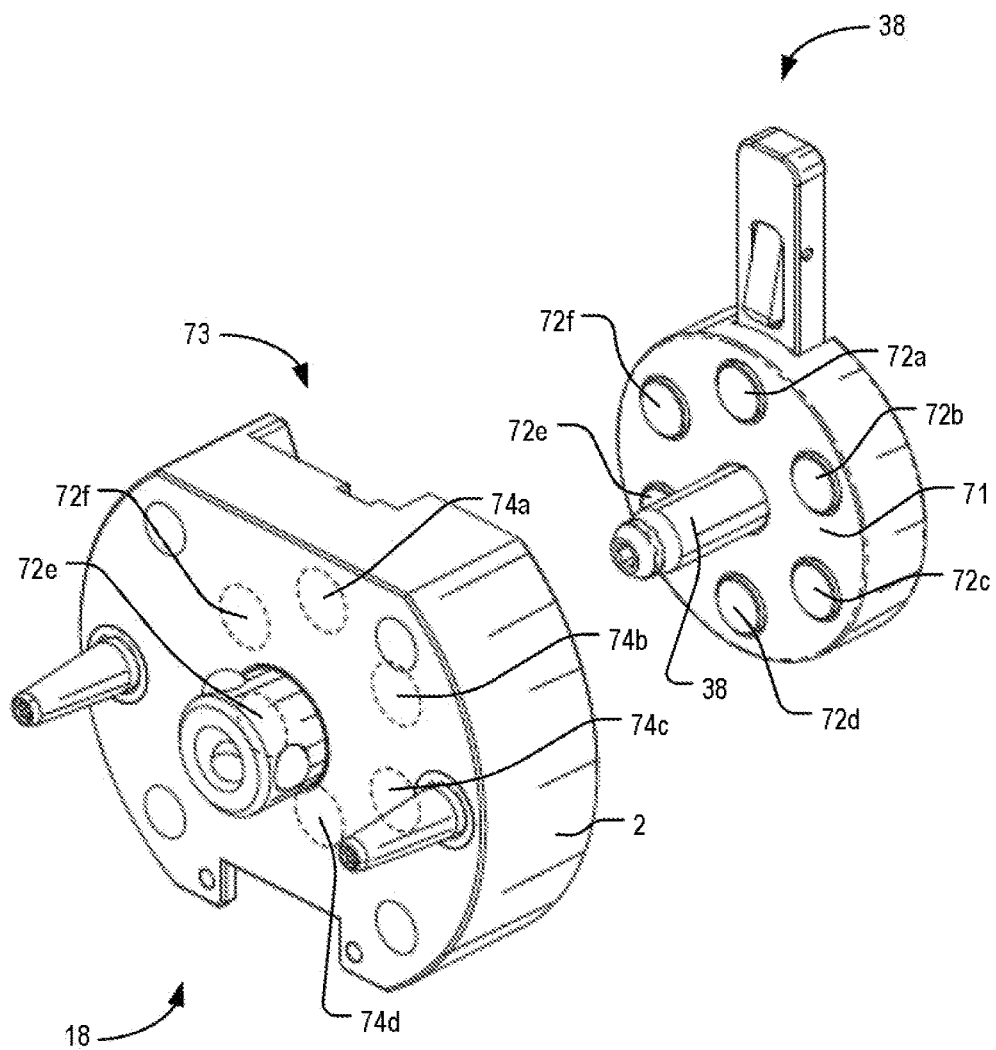
FIG. 7 provides a perspective view of one embodiment of the horizontal member and the piston of the master unit of FIG. 1 in accordance with various aspects as described herein.

The first magnetic member 71 may include a disc having a plurality of magnets 72a-f affixed to the disc, as shown in FIG. 7. Further, each of the magnets 72a-f may be oriented to project a magnetic field having the same orientation or at least two of the magnetic fields having opposite orientations. In one example, adjacent magnets 72a-f may have opposite orientation. The second magnetic member 73 may also include a disc having a plurality of magnets 74a-f affixed to the disc, as shown in FIG. 7. Further, each of the magnets 74a-f may be oriented to project a magnetic field having the same orientation or at least two of the magnetic fields having opposite orientations. In one example, adjacent magnets 74a-f may have opposite orientation. While this embodiment describes the second magnetic member 73 being in the master unit 12, the second magnetic member 73 may instead be in the tool unit 14.

As previously mentioned, the first magnetic member 71 may be circumferentially moveable within the housing 2 along the piston axis 32 so that the first magnetic member 71 is magnetically coupled to or decoupled from the tool unit 14. When the first magnetic member 71 is in the second radial position 39b, a net attractive magnetic force between the magnetic fields of the magnets 72a-f of the first magnetic member 71 and the magnetic fields of the magnets 74a-g of the second magnetic member 73 may move the piston 30 to the extended position. Further, when the first magnetic member 71 is in the first radial position 39a, a net repulsive magnetic force between the magnetic fields of the magnets 72a-f of the first magnetic member 71 and the magnetic fields of the magnets 74a-g of the second magnetic member 73 may move the piston 30 to the retracted position. A person of ordinary skill in the art will recognize various techniques of configuring magnets to achieve attractive and repulsive magnetic forces.

Figure 8A:
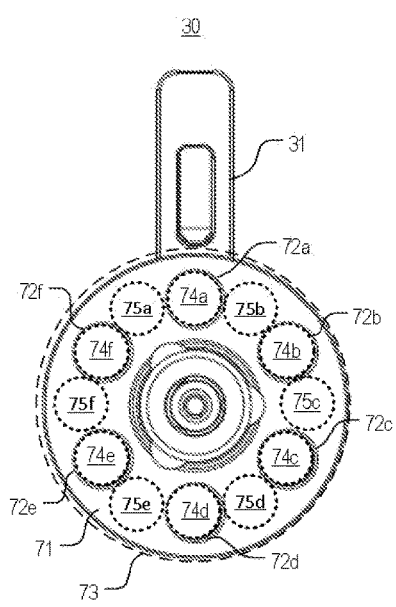
FIGS. 8A-B provide top views of first and second magnetic members in respective locked and unlocked positions in accordance with various aspects as described herein.
Figure 8B:
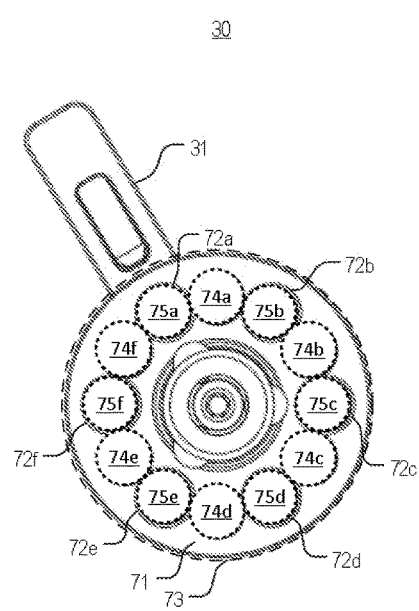

FIGS. 8A-B provide top views of another embodiment of the first and second magnetic members 71 and 73 in respective locked and unlocked positions in accordance with various aspects as described herein. In FIGS. 8A-B, the second magnetic member 73 may be part of the master unit 12 or the tool unit 14. To lock the tool unit 14 with the master unit 12, the first magnetic member 71 may be circumferentially moved to the second radial position. By doing so, the first and second magnetic members 71 and 73 are radially aligned so that a net attractive magnetic force between the magnetic fields of the magnets 72a-f of the first magnetic member 71 and the magnetic fields of the magnets 74a-f of the second magnetic member 73 actuates the piston 30 into the extended position. To unlock the tool unit 14 from the master unit 12, the first magnetic member 71 may be circumferentially moved to the first radial position. By doing so, the first and second magnetic members 71 and 73 are radially aligned so that a net repulsive magnetic force between the magnetic fields of the magnets 72a-f of the first magnetic member 71 and the magnetic fields of the magnets 75a-f of the second magnetic member 73 actuates the piston 30 into the retracted position.

Figure 9A:
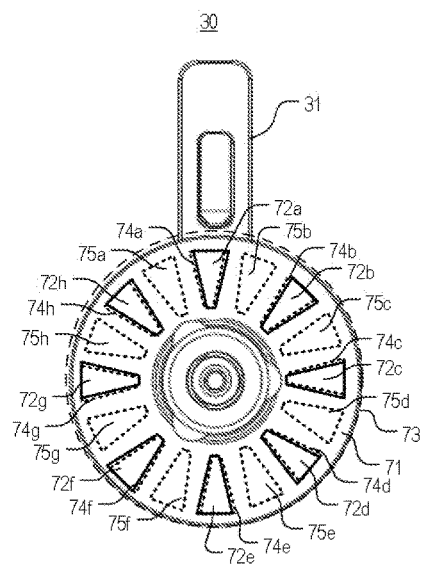
FIGS. 9A-B provide top views of another embodiment of first and second magnetic members in respective locked and unlocked positions in accordance with various aspects as described herein.
Figure 9B:
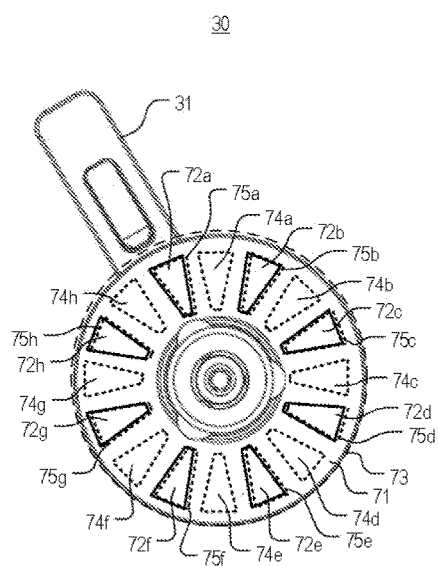

FIGS. 9A-B provide top views of another embodiment of the first and second magnetic members 71 and 73 in respective locked and unlocked positions in accordance with various aspects as described herein. In FIGS. 9A-B, the second magnetic member 73 may be part of the master unit 12 or the tool unit 14. To lock the tool unit 14 with the master unit 12, the first magnetic member 71 may be circumferentially moved to the second radial position 39b. By doing so, the first and second magnetic members 71 and 73 are radially aligned so that a net attractive magnetic force between the magnetic fields of the magnets 72a-h of the first magnetic member 71 and the magnetic fields of the magnets 74a-h of the second magnetic member 73 actuates the piston 30 into the extended position. To unlock the tool unit 14 from the master unit 12, the first magnetic member 71 may be circumferentially moved to the first radial position 39a. By doing so, the first and second magnetic members 71 and 73 are radially aligned so that a net repulsive magnetic force between the magnetic fields of the magnets 72a-h of the first magnetic member 71 and the magnetic fields of the magnets 75a-h of the second magnetic member 73 actuates the piston 30 into the retracted position.

Figure 10:
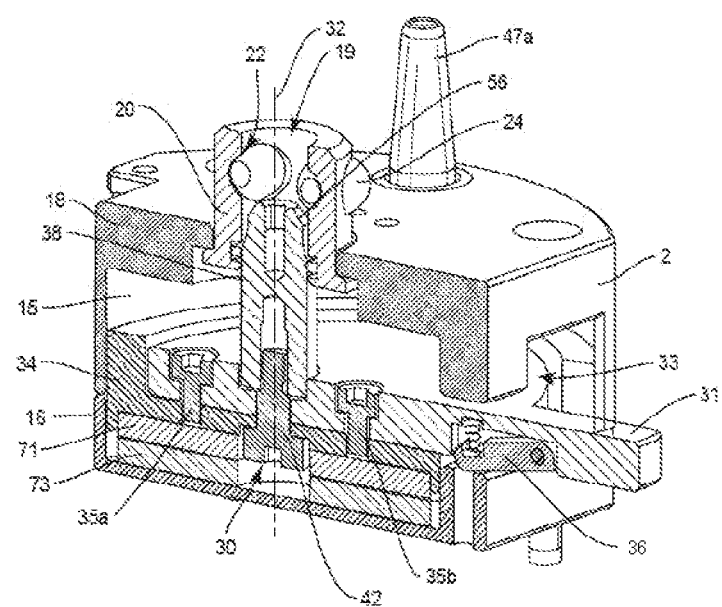
FIG. 10 is a cross-sectional view of another embodiment of the master unit in an unlocked position in accordance with various aspects as described herein.
Figure 11:
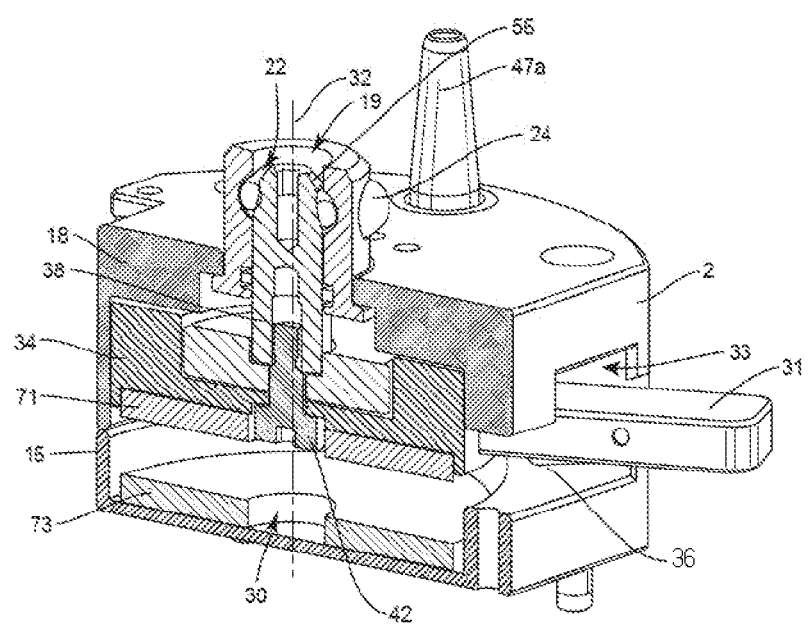
FIG. 11 is a cross-sectional view of the master unit of FIG. 10 in a locked position in accordance with various aspects as described herein.

FIGS. 10-11 provide various views of another embodiment of the master unit 12 in accordance with various aspects as described herein. In FIG. 10, the master unit 12 is shown in a decoupled state. In FIG. 11, the master unit 12 is shown in a coupled state. As shown in FIGS. 10-11, the stem 38 may extend through the opening 19 formed in the horizontal member 18 of the housing 2. A screw 42 extends through a portion of the handle 31, a portion of the base 34, and into a threaded cavity formed in the stem 38. By tightening the screw 42, the base 34, the handle 31, and the first magnetic member 71 may be coupled or connected to the stem 38 to form the piston 30.

In this embodiment, the piston 30 may include the first magnetic member 71. The first magnetic member 71 may be centered with respect to the base 34 and the stem 38. Further, the first magnetic member 71 may be fixed to the bottom of the base 34. The second magnetic member 73 may be fixed to the floor of the housing 2. The first magnetic member 71 may be planar to and opposite from the second magnetic member 73. Further, the first magnetic member 71 may be operative to circumferentially move at least partially about the piston axis 32 between a first radial position and a second radial position. The handle 31 may be fixed to the first magnetic member via screws 35a-b. The handle 31 may operate to circumferentially move the first magnetic member 71 at least partially about the piston axis 32 between the first radial position and the second radial position within the opening 33. The handle 31 may include a locking tab 36 (e.g., a spring-biased locking tab) operative to lock the handle 31 against the housing 2 when the first magnetic member 71 is in the second radial position, as shown in FIG. 10. Otherwise, the locking tab 36 may be operative to unlock the handle 31 to allow the first magnetic member 71 to be circumferentially moved via the handle 31 to the first radial position, as shown in FIG. 11.

In FIGS. 10-11, the master unit 12 may include the first magnetic member 71 that projects a plurality of magnetic fields over different surface areas of the first magnetic member 71. The magnetic fields may have the same orientation or at least two of the magnetic fields may have opposite orientation. Further, the first magnetic member 71 may be operative to circumferentially move at least partially about the piston axis 32 between the first radial position corresponding to the unlocked position and the second radial position corresponding to the locked position. To lock the tool unit 14 with the master unit 12, the first magnetic member 71 may be circumferentially moved to the second radial position. By doing so, the first and second magnetic members 71 and 73 are radially aligned so that a net repulsive magnetic force between the first and second magnetic members 71 and 73 actuates the piston 30 into the extended position, as shown in FIG. 11. To unlock the tool unit 14 from the master unit 12, the first magnetic member 71 may be circumferentially moved to the first radial position. By doing so, the first and second magnetic members 71 and 73 are radially aligned so that a net attractive magnetic force between the first and second magnetic members 71 and 73 actuates the piston 30 into the retracted position, as shown in FIG. 10. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic tool changer, comprising:
   a tool unit operative to connect to a robotic tool; and
   a master unit operative to connect to a robotic arm, wherein the master unit includes:
      a housing;
      a piston disposed at least partially within the housing and configured to place the master unit in one of a coupled state and a decoupled state, wherein the coupled state is associated with the master unit being securely coupled to the tool unit and the decoupled state is associated with the master unit being decoupled from the tool unit;
      wherein the master unit is operative to assume the coupled state in response to altering an orientation of magnetic fields, by circumferentially moving a first magnetic member at least partially about the piston axis between a first radial position and a second radial position, to provide a first magnetic force that moves the piston to the coupled state and holds it there; and
      wherein the master unit is operative to assume the decoupled state in response to altering an orientation of the magnetic fields to provide a second magnetic force that moves the piston to the decoupled state;
      a first magnetic member projecting a plurality of magnetic fields over different surface areas of the first magnetic member, the magnetic fields having a same orientation or at least two of the magnetic fields having opposite orientation, the first magnetic member operative to circumferentially move at least partially about the piston axis between a first radial position and a second radial position.

2. The robotic tool changer of claim 1, wherein the piston is actuated along a piston axis between a retracted position and an extended position, wherein the retracted position corresponds to the decoupled state of the master unit and the extended position corresponds to the coupled state of the master unit.

3. The robotic tool changer of claim 1, wherein the tool unit further includes:
   a bearing race disposed radially around the piston axis;
   one or more rolling members disposed radially around the piston axis in the bearing race; and
   wherein the piston includes at least one angled surface operative to engage and radially move the one or more rolling members to engage the bearing race as the piston axially moves from the retracted position to the extended position.

4. The robotic tool changer of claim 3, wherein the at least one angled surface includes:
   an initial contact surface including a conical surface operative to contact the one or more rolling members and urge them radially with respect to the piston axis, towards the bearing race, as the piston moves from the retracted position toward the extended position;
   a locking surface including a conical surface inclined in the same direction as the initial contact surface, and operative to press the one or more rolling members against the bearing race when the piston is in the extended position; and
   a failsafe surface interposed between the initial contact surface and the locking surface, and operative to resist movement of the piston, due to force applied to the piston by the one or more rolling members, from the extended position toward the retracted position.

5. The robotic tool changer of claim 4, wherein the failsafe surface includes a cylindrical surface centered on the piston axis, wherein a force applied to the failsafe surface from the one or more rolling members is normal to the piston axis.

6. The robotic tool changer of claim 4, wherein the failsafe surface includes a conical or arcuate surface having an opposite inclination with respect to the piston axis from the initial contact and locking surfaces, whereby the one or more rolling members must be further moved at least slightly towards the bearing race to move the piston from the extended position towards the retracted position.

7. The robotic tool changer of claim 1, wherein the first magnetic member projects a plurality of magnetic fields over different surface areas of the first magnetic member, the magnetic fields having a same orientation or at least two of the magnetic fields having opposite orientation.

8. The robotic tool changer of claim 7, wherein the first magnetic member includes a plurality of magnets affixed to a disc, the magnets being oriented to project the magnetic fields having the same orientation or the at least two magnetic fields having opposite orientation.

9. The robotic tool changer of claim 7, wherein the first magnetic member includes a disc, wherein different surface areas of the disk are magnetized so as to project the magnetic fields having a same orientation or the at least two magnetic fields having opposite orientation.

10. The robotic tool changer of claim 7, wherein one of the master unit and the tool unit is further configured to project a plurality of magnetic fields over different surface areas of the first magnetic member.

11. The robotic tool changer of claim 10, wherein the first magnetic member is moveable within the housing along the piston axis so that the first magnetic member is magnetically coupled to or decoupled from the corresponding master unit or tool unit.

12. The robotic tool changer of claim 10, wherein:
when the first magnetic member is in the first radial position, a net attractive magnetic force between the first magnetic member and the master unit moves the piston to the retracted position; and
when the first magnetic member is in the second radial position, a net repulsive magnetic force between the first magnetic member and the master unit moves the piston to the extended position.

13. The robotic tool changer of claim 10, wherein:
when the first magnetic member is in the first radial position, a net repulsive magnetic force between the first magnetic member and the tool unit moves the piston to the retracted position; and
when the first magnetic member is in the second radial position, a net attractive magnetic force between the first magnetic member and the tool unit moves the piston to the extended position.

14. The robotic tool changer of claim 7, wherein the first magnetic member is manually moved between the first and second radial positions.

15. The robotic tool changer of claim 7, wherein the first magnetic member includes a handle extending outwardly of the housing, the handle being operative to circumferentially move the first magnetic member at least partially about the piston axis between the first radial position and the second radial position.

16. The robotic tool changer of claim 15, wherein the handle includes a spring-biased locking tab operative to lock the handle against the housing when the first magnetic member is in the second radial position.

17. The robotic tool changer of claim 1, wherein the tool unit further includes:
a coupling receptacle configured to mechanically couple to the piston.

18. A method of operating a robotic tool changer having a master unit and a tool unit, the master unit having a piston configured to place the master unit in one of a coupled state and a decoupled state, the coupled state associated with the master unit being securely coupled to the tool unit and the decoupled state associated with the master unit being decoupled from the tool unit, comprising:
aligning and abutting the master unit to the tool unit using the piston;
placing the master unit in the coupled state by altering an orientation of magnetic fields, by circumferentially moving a first magnetic member at least partially about the piston axis between a first radial position and a second radial position, to provide a first magnetic force that moves the piston to the coupled state and holds it there; and
placing the master unit in the decoupled state by altering an orientation of the magnetic fields to provide a second magnetic force that moves the piston to the decoupled state.

19. The method of claim 18, wherein the first magnetic member projects a plurality of magnetic fields over different surface areas of the first magnetic member, at least two of the magnetic fields having opposite orientation;
wherein placing the master unit in the decoupled state includes circumferentially moving the first magnetic member at least partially about the piston axis to the first radial position; and
wherein placing the master unit in the coupled state includes circumferentially moving the first magnetic member at least partially about the piston axis to the second radial position.

20. The method of claim 19, wherein one of the master unit and the tool unit further includes projecting a plurality of magnetic fields over different surface areas of the first magnetic member,
wherein placing the master unit in the decoupled state includes circumferentially moving the first magnetic member at least partially about the piston axis to a first radial position so that a net repulsive magnetic force between the first magnetic member and the corresponding master unit or tool unit moves the piston to the retracted position; and
wherein placing the master unit in the coupled state includes circumferentially moving the first magnetic member at least partially about the piston axis to a second radial position so that a net attractive magnetic force between the first magnetic member and the corresponding master unit or tool unit moves the piston to the extended position.

* * * * *